United States Patent
Tran

(10) Patent No.: US 6,873,269 B2
(45) Date of Patent: Mar. 29, 2005

(54) EMBEDDED FREE FLIGHT OBSTACLE AVOIDANCE SYSTEM

(75) Inventor: My Tran, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 59 days.

(21) Appl. No.: 10/446,526

(22) Filed: May 27, 2003

(65) Prior Publication Data
US 2004/0239529 A1 Dec. 2, 2004

(51) Int. Cl.[7] ............................................. G08G 5/04
(52) U.S. Cl. ...................... 340/961; 340/945; 340/963; 701/14; 701/301; 342/29
(58) Field of Search ..................... 340/945, 947, 340/961, 963; 701/14, 120, 301; 342/29, 30

(56) References Cited

U.S. PATENT DOCUMENTS

| 5,892,462 A | | 4/1999 | Tran | 340/961 |
|---|---|---|---|---|
| 6,182,005 B1 | * | 1/2001 | Pilley et al. | 701/120 |
| 6,262,697 B1 | | 7/2001 | Stephenson | 345/43 |
| 6,531,978 B2 | * | 3/2003 | Tran | 342/29 |
| 6,584,383 B2 | * | 6/2003 | Pippenger | 701/3 |
| 6,646,588 B2 | * | 11/2003 | Tran | 342/29 |

* cited by examiner

Primary Examiner—Daryl C. Pope

(57) ABSTRACT

A free flight obstacle avoidance system (OAS) is a commanded obstacle resolution feedback system. The system employs insertion of hybridized elements to the existing designs of Adaptive Ground Collision Avoidance Systems and Midair Collision Avoidance Systems along with a newly design module, the obstacle avoidance dispatcher and resolver, to provide a coherent obstacle resolution. The system is capable of filtering data produced by the hybrid ground collision avoidance module and the hybrid air collision avoidance module, inserting evaluating solution status and command directives before routing avoidance data to hybrid modules for validation. The dispatcher and resolver module determines the final obstacle resolution to generate avoidance control guidance and appropriate warnings clearly indicated obstacle situation and obstacle avoidance maneuvers to the flight crew. In addition to the avoidance capabilities, the system also provides extended functions of terrain following guidance and space separation warnings.

21 Claims, 12 Drawing Sheets

EMBEDDED FREE FLIGHT OBSTACLE AVOIDANCE SYSTEM

BACKGROUND OF THE INVENTION

1. Field of the Invention (Technical Field)

The present invention relates generally to the field of avionics for obstacle avoidance systems to provide complete coverage for both air collision avoidance and ground collision avoidance situations. More specifically, the present invention relates to a hybridized multiple domain handler avoidance system for managing instantaneous real-time feedback of obstacle data to provide a fully compatible obstacle solution to air and ground situation in a free flight regime.

2. Background Art

An aircraft equipped with an embedded free flight obstacle avoidance system (OAS) has the capabilities to uniquely avoid both a ground collision and an air collision. These capabilities are achieved by incorporating a dispatcher and collision resolver module. This module provides filtering of collision solution data, evaluating, and routing feedback data resulting from cross-domain verification in hybrid modules. By inserting hybrid processing capabilities, the hybrid ground collision avoidance module can predict if the solution produced by the hybrid air collision avoidance module will have a ground clearance and similarly, the hybrid air collision module can also predict if the solution produced by the hybrid ground collision module will not misguide the aircraft to an unsafe airspace.

Spurred by the collision of two airliners over the Grand Canyon in 1956, the airlines initiated a study of collision avoidance concepts. By the late 1980's, a system for airborne collision avoidance was developed with the cooperation of the airlines, the aviation industry, and the Federal Aviation Administration (FAA). The system, referred to as Traffic Alert and Collision Avoidance System II (TCAS II) was mandated by Congress to be installed on most commercial aircraft by the early 1990's. A chronology of the development of airborne collision avoidance systems can be found in "Introduction to TCAS II," printed by the Federal Aviation Administration of the U.S. Department of Transportation, March 1990.

The development of an effective airborne obstacle collision avoidance system (CAS) has been the goal of the aviation community for many years. Airborne obstacle collision avoidance systems provide protection from collisions with other aircraft. As is well appreciated in the aviation industry, avoiding collisions with other aircraft is a very important endeavor. Furthermore, collision avoidance is a problem for both military and commercial aircraft alike. Therefore, to promote the safety of air travel, systems that avoid collision with other aircraft and terrain are highly desirable.

An air collision avoidance system (see, e.g., Tran, U.S. Pat. No. 6,262,697 B1, Midair Collision Avoidance System) monitors the flight paths of intruders operating in the same airspace with the aircraft to provide warnings and air collision avoidance commands. This system effectively provides solutions to air collision conditions and also provides solutions for potential terrain collision situations. Both of these systems are stand-alone systems. The prior art system does not describe a means to provide air collision feedback or provide a validation status for ground solutions from an air operational perspective. Lacking some of the refined capabilities of this invention, it is difficult for a "conventional" air collision avoidance system to provide a complete dynamics picture of air and ground situation along with the avoidance maneuvers or as herein referred to as obstacle avoidance.

Another prior art system is a ground collision avoidance system (see, e.g., Tran, U.S. Pat. No. 5,892,462, Adaptive Ground Collision Avoidance System), which uses a predictive flight path to estimate the flight path envelope along with the accurate terrain information to determine whether a ground collision condition exists. The resulting solution is determined from prediction calculations and provides warnings and appropriate generated maneuvers to avoid a ground collision. This solution is applied solely to a terrain elevation domain without taking the aircraft's traveling in time and in space into consideration. Without the feedback and validation of the solution from an air collision coverage domain, the avoidance solution in many instances does not have a complete free clearance for obstacle avoidance.

SUMMARY OF THE INVENTION (Disclosure of the Invention)

The present invention is a free flight obstacle avoidance system that preferably is an embedded system in an integrated avionics environment. The system comprises of three main components, an obstacle avoidance management module and two obstacle avoidance engines. The obstacle avoidance management module continuously monitors the status of ground collision conditions and air collision conditions and the solutions generated by the two indicated engines. This module also serves as a filtering medium and a conduit for passing the collision resolution file from one engine to another engine to further evaluate and confirm that the indicated solution will not introduce a new collision condition. If there is a new collision condition found, then the information from the evaluation is routed back to the originated solution module for re-planning to generate a more suitable avoidance solution to a complex obstacle situation. When there is no potential conflict with the provided solution, the obstacle management module will process the obstacle solution package along with the original tag to generate specific guidance data, and can include an obstacle avoidance situation display, and a synthesized audio message being specific to the situation to warn the flight crew. The second component is a hybrid terrain collision avoidance engine. This engine takes into account the global air traffic management (GATM) information, terrain data, air data, radar altitude, and the check data contained air collision verification data, if there is a conflict found in the second engine, to predict and generate a suitable solution for ground and specific air avoidance solutions. The third component is a hybrid air collision avoidance module to predict and generate a suitable solution for air and specific ground avoidance solutions.

The present invention provides a cross-feed of collision and avoidance data produced by two avoidance modules by implanting unique air avoidance capabilities in the hybrid terrain collision avoidance engine and unique ground avoidance capabilities in the hybrid air collision avoidance module, along with the arbitration and controlling capability in the obstacle avoidance management module, which results in producing an obstacle solution.

It is an object of the present invention to provide obstacle avoidance control guidance being compatible with instantaneous operating air space and localized terrain and feature situations, and unambiguous warnings to any flight crew operating an aircraft. The control guidance and warnings produced from a single domain system, in some instances, can create ambiguity and uncertainty to the operation of the flight crew.

It is also an object of the present invention to provide an embedded obstacle avoidance system that is capable of routing and inserting commands and status to individual modules for a continuous validation of an avoidance resolution.

It is a further object of the present invention to provide an obstacle avoidance system, which is capable to operate simultaneously in a dual-domain mode and will provide a flexible capability needed for an aircraft to operate safely and effectively in a free flight environment.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (Best Modes for Carrying out the Invention)

Figure 1:
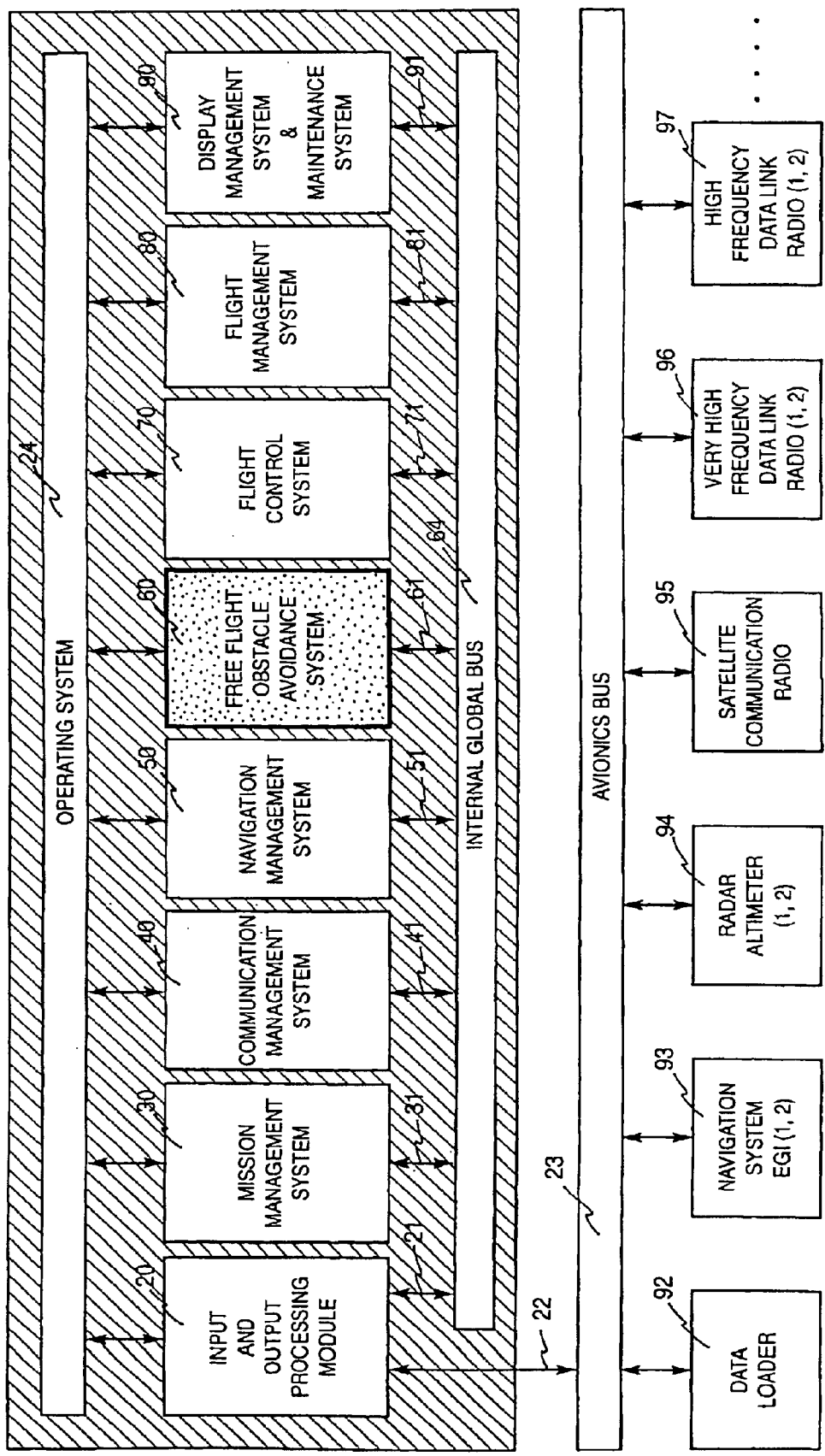
FIG. 1 is a diagram showing the embedded structure of the preferred free flight obstacle avoidance system.

Referring to FIG. 1, there is shown the preferred embedded structure of the free flight obstacle avoidance system 60 along with other avionics systems. This is a modular structure of an integrated avionics architecture with various embedded systems. The free flight obstacle avoidance system 60 is configured in a module. In this system architecture, there is an input and output-processing module 20. This module will process and control receipt and transmission of all necessary information to and from the avionics systems in addition to schedule the information among the embedded modules. Mission management system 30 monitors mission equipment and provides tactical threat information to the display management system 90 to provide tactical information overlaying. Communication management system 40 provides a physical communication link layer and controls the onboard digital communication link equipment and transponder system. This module serves as a communication conduit with other aircraft and air traffic control centers for the free flight obstacle avoidance system in terms of transmitting and receiving obstacle avoidance information. The navigation management system 50 provides control to the navigation sensor equipment and processes navigation information provided by the navigation sensors to provide a best estimate aircraft navigation vector to the free flight obstacle avoidance system. The free obstacle avoidance system module 60 embedded in this structure is the top-level layout for this invention. The free flight obstacle avoidance system 60 processes the obstacle information received by the digital data link and aircraft data from other embedded avionics systems (i.e.; mission management system, communication management system, navigation management system, flight control system and flight management system) in order to predict obstacle situations and provide a high fidelity solution to the predicted obstacle situation. The control and guidance solution along with the flight mode generated by the free flight obstacle avoidance module 60 is sent to the flight control system 70, to allow a transition to the obstacle avoidance mode. When the obstacle avoidance mode is active, the flight control system 70 uses the provided control commands in the coupling mode to follow the commanded path in maneuvering the aircraft. The flight management system 80 updates the active flight plan by inserting avoidance segments based on the predictive obstacle avoidance flight path and obstacle mode status and processes the indicative mode states for the lateral mode and vertical mode. In addition, the flight management system 80 initiates a re-computation of distance to go and estimated time arrival for down path waypoints and also for a final destination based on target vertical speed and target altitude. The computed updated data are then downlinked to the air traffic control management. The display management system and maintenance system 90 manages the display selection to provide an image of the obstacle situation with an overlaying of flight mode, flight guidance commands, and the air and ground avoidance situation to the flight crew. The free flight obstacle avoidance module 60 is connected and communicated with other embedded avionics systems through an internal global bus 64. This bus will provide arbitration and scheduling for moving the data between embedded modules with minimum latency, to ensure the currency of data required by processing criteria in each module. However, to communicate outside of the embedded avionics environment, there are different buses bundled into a conduit called avionics bus 23. This conduit can be a combination of ARINC-429 busses, MIL-1553B busses, high-speed Ethernet busses and any standard buses. A number of sensors and devices are connected to this bus. A data loader 92 connects to avionic bus 23 to provide mission data, navigation data, terrain and elevation data to various embedded systems. Navigation sensors 93 such as inertial navigation system (INS) and global position system (GPS) also connect to the avionics bus 23 to provide navigation data such as aircraft position, heading, ground speed, vertical velocity and altitudes. Air data unit and radar altimeter 94 is connected to avionics bus 23 to provide local barometric altitude and radar altitude information. The digital data link between platforms and air traffic control are performed through a very high frequency data link radio 96, high frequency data link radio 97 and satellite communication unit 95.

Figure 2:
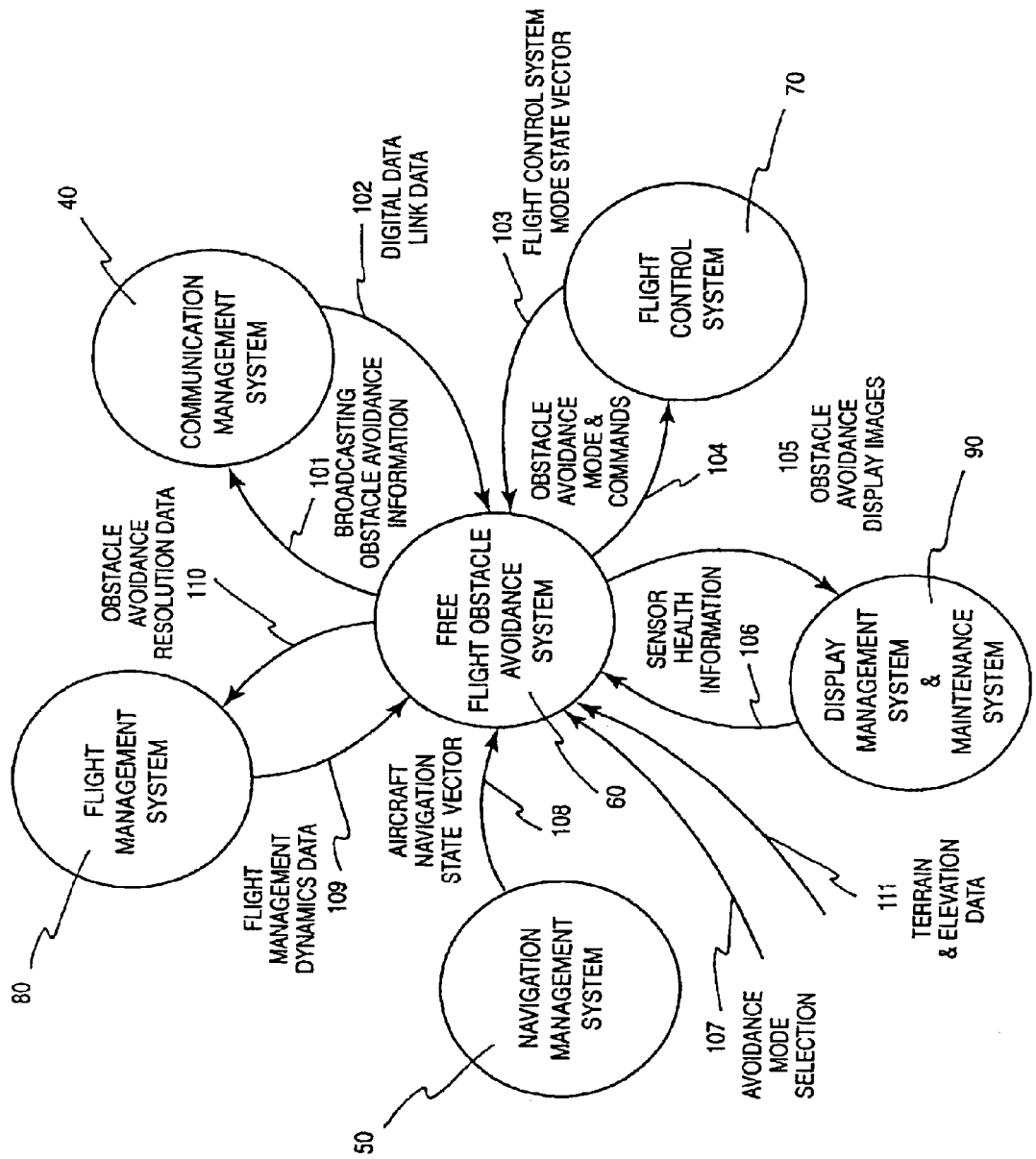
FIG. 2 is a functional diagram showing the interfaces between the free flight obstacle avoidance system and other embedded avionics systems, external subsystems and control panels in accordance with the present invention.

Referring to FIG. 2, there is shown a behavior diagram with data and control flows from other embedded avionics, sub-systems, and control panels to the free flight obstacle avoidance system 60. After system power-up, the free flight obstacle avoidance operation will be placed in the standby mode. The system will then check the avoidance mode selection signal 107 set by the flight crew with a three-position switch on the GATM safety panel. With the switch in a neutral position, the system will place the system in the hybrid obstacle avoidance mode. The up and down position of the OAS switch will command the system to operate in a ground avoidance only mode and an air avoidance only mode respectively. The status of the obstacle avoidance mode is provided along with the obstacle avoidance data such as an obstacle avoidance predictive path in obstacle avoidance resolution data 110 to flight management system 80. Target guidance and control commands are also provided in the data flow obstacle avoidance resolution data 110 to the flight management system 80. The status of the obstacle avoidance is presented on the multiple control display unit (MCDU), a primary display as well as the heads-up display. The free fight obstacle avoidance system processes the status of the engagement of the lateral and vertical guidance along with the guidance commands in the data flow flight management dynamics data 109 in order to provide command synchronization prior to coupling with the flight control system 70. The navigation management system 50 continuously calculates aircraft dynamics parameters and provides best estimates of the aircraft position in term of latitude, longitude, vertical speed, track angle, and altitude. This information is packed in the aircraft navigation state vector 108. The database information comprised of terrain, feature and elevation data 111 is used in performing predictions for ground obstacle situations and is provided to the free flight obstacle avoidance system 60. Communication management system 40 provides routing of tactical data in the digital data-link data 102 from other aircraft and processes the autonomous broadcasting obstacle avoidance information 101 generated by the free flight obstacle avoidance system 60 to other aircraft operating in a surrounding and intermediate air space. The receiving data package preferably includes transmit time, aircraft type, host aircraft attitude, position, altitude, heading, airspeed, vertical speed, flight path angle, and obstacle avoidance mode in digital data link data 102. Similarly, the communication management system 40 processes the data generated by the free flight obstacle avoidance system 60, performs proper handshake protocols with the data link system 102 to broadcast obstacle avoidance data 101 to other platforms and the air traffic management on the ground. Communication management system 40 determines the proper routing methods to send the broadcasted data to other platforms. The free flight obstacle avoidance system 60 also receives data from the fight control system 70. The data provided by this system preferably include current flight mode for lateral axis, vertical axis, and thrust axis as defined in the flight control system mode state vector 103. Based on the input data, if the free flight obstacle avoidance system 60 predicts an imminent obstacle collision and determines a proper resolution for the identified obstacle, the obstacle flight mode will be set and control commands will be computed and sent to the flight control system 70 as indicated in the obstacle avoidance mode and commands 104. In order to determine the operational mode, the free flight obstacle avoidance system monitors the sensor health information 106 of various sensors such as radar altimeter, navigation sensors, data loader system, and radio data link systems. The free flight obstacle avoidance system 60 generates a display image to present the ground and air situation. If there is an obstacle situation emerging, the free flight obstacle avoidance system 60, generates an overlay symbology depicting the dangerous level approaching to the flight crew along with the obstacle avoidance guidance cues. The display imaging is sent to the display management system 90 in the obstacle avoidance display image 105.

Figure 3:
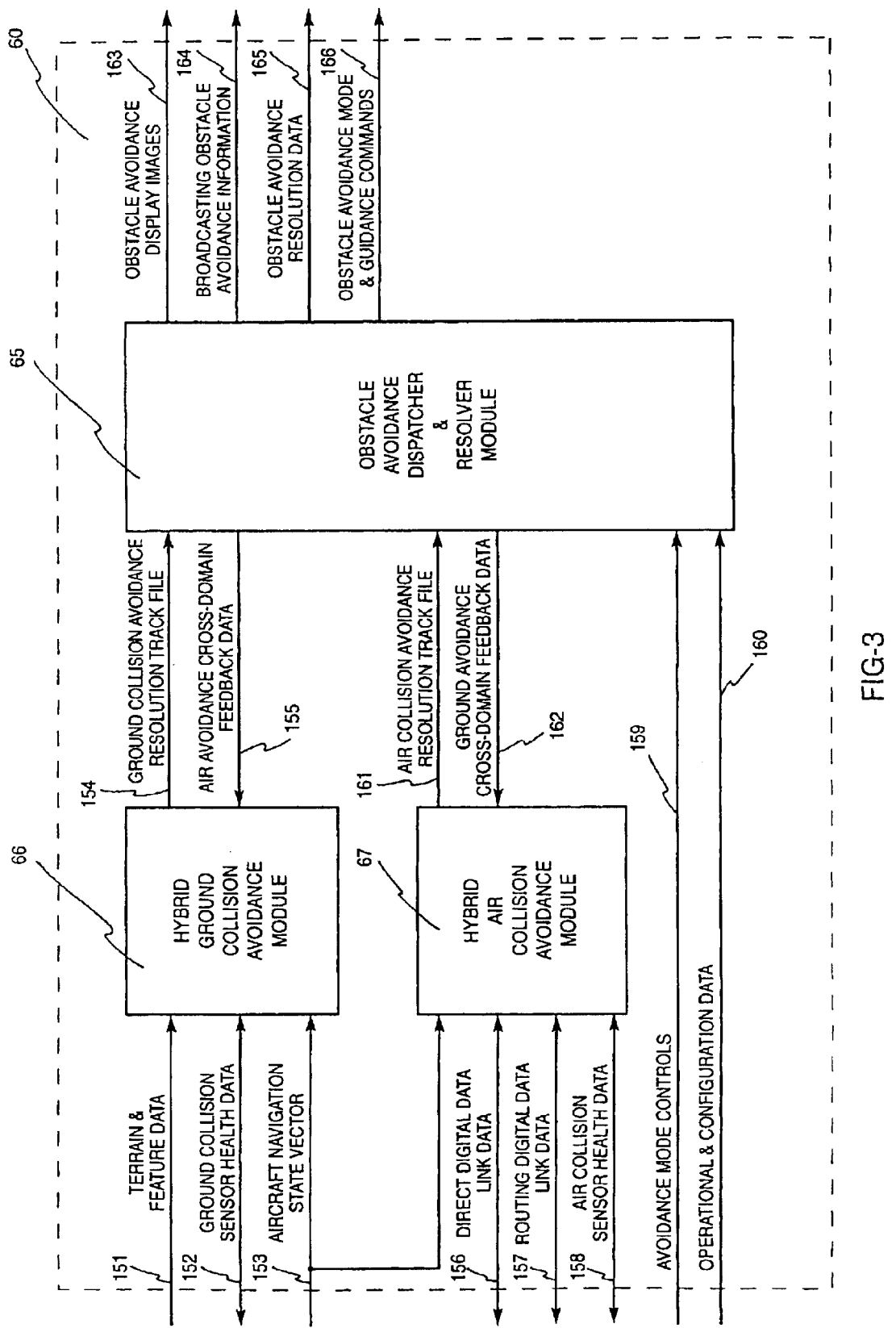
FIG. 3 is a block diagram shown hybrid components of the preferred free flight obstacle avoidance system in accordance with the present invention.

Referring to FIG. 3, there is shown a modularized structural diagram of the hybrid components that make up the free flight obstacle avoidance system. Each of three components provides unique functional capabilities. The obstacle avoidance dispatcher and resolver module (OADRM) 65 provides an array of system capabilities that include data control, data filtering, data management, data correlation, and arbitration for an obstacle resolution. The arbitration is performed to ensure that the obstacle solution generated by either the hybrid ground collision avoidance module (HGCAM) 66 or the hybrid air collision avoidance module (HACAM) 67 is completely compatible with the air and ground situations. To achieve the "compatibility" for an obstacle avoidance maneuvering, OADRM 65 dispatches the solution along with auxiliary data produced in one hybrid module to another hybrid module for verification and validation. If the solution results in a collision condition through a verifying phase, then OADRM 65 will send back the solution to the originator module with an addition of verified information. The originator can then use the newly provided information to either modify the original solution or process for an entirely new solution. OADRM 65 monitors the data contained in the ground collision avoidance resolution track file 154 to determine if a predicted ground collision condition exists. If the condition exists, OADRM 65 extracts the information in data package 154 and sends it to the HACAM 67 to perform verification. After verifying the comparability with the air domain for the ground solution, HACRM 67 transmit this information back via data package air collision avoidance resolution track file 161. OADRM 65 checks for compatibility flags in the ground avoidance cross-domain feedback data 162. If compatibility is obtained, OADRM 65 will overlay the obstacle data with the map data and the air traffic data to provide obstacle avoidance display images 163 and sends them to display management system 90 for image rendering. The obstacle resolution along with the aircraft dynamics navigation vector are packed in the broadcasted obstacle avoidance information 164 and sent to the communication management system 40. OADRM 65 sets the state of the obstacle avoidance mode and feeds the control target through the obstacle guidance control laws to generate proper mode and guidance commands 166 for the flight control system 70. The filtered obstacle avoidance resolution data 165 is sent to the flight management system 80 for flight plan updates and informing the air traffic management of impending changes in the active flight plan. Similarly, OADRM 65 monitors the data contained in the air collision avoidance resolution track file 161 to determine if a predicted air collision condition exists. If the condition exists, OADRM 65 extracts the information from air collision avoidance resolution track file 161 and sends it to the HGCAM 66 to perform verification via air avoidance cross-domain feedback 155. After verifying the comparability with the ground domain for the air solution, HGCAM 66 transmits the information back in the ground collision avoidance resolution track file 154 data package. OADRM 65 checks for a ground compatibility flag in the air avoidance cross-domain feedback data 155. If compatibility is obtained, OADRM 65 will overlay the obstacle data with the air traffic data with map terrain map background 60 and send this image data to the display management system 90. In addition, OADRM 65 generates obstacle avoidance mode and guidance commands 166 for flight control system 70 and then re-plans the flight path to the flight management system 80 for flight plan updates and fuel and time performance predictions. OADRM 65 also has the capability to filter the data provided by the two hybrid modules, 66 and 67, continuously process streams of data, and determine the necessary data to route to the cross-domains for compatibility checks. The HGCAM 66 operates in two primary modes, a continuous predicting ground collision mode and verifying ground clearance mode for air collision avoidance solutions. To predict the ground collision conditions on continuous basis, HGCAM 66 relies on the terrain and features data 151, ground collision sensor health data 152 and aircraft navigation state vector 153. In the verification mode, HGCAM 66 uses the information contained in the air avoidance cross-domain feedback data 155 in addition to the indicative inputs to determine terrain clearance for the indicated solution. HACAM 67 also operates in two primary modes, a continuous predicting air collision mode and a verifying air space clearance for ground collision avoidance mode. To predict the air collision condition on continuous basis, HACAM 67 relies on direct digital data link data 156, routing digital data link data 157, air collision sensor health data 158, and aircraft navigation state vector 153. In the air verification mode, HACAM 67 uses the information contained in the ground avoidance cross-domain feedback data 162 in addition to the indicative inputs to determine terrain clearance for the indicated solution.

Figure 4:
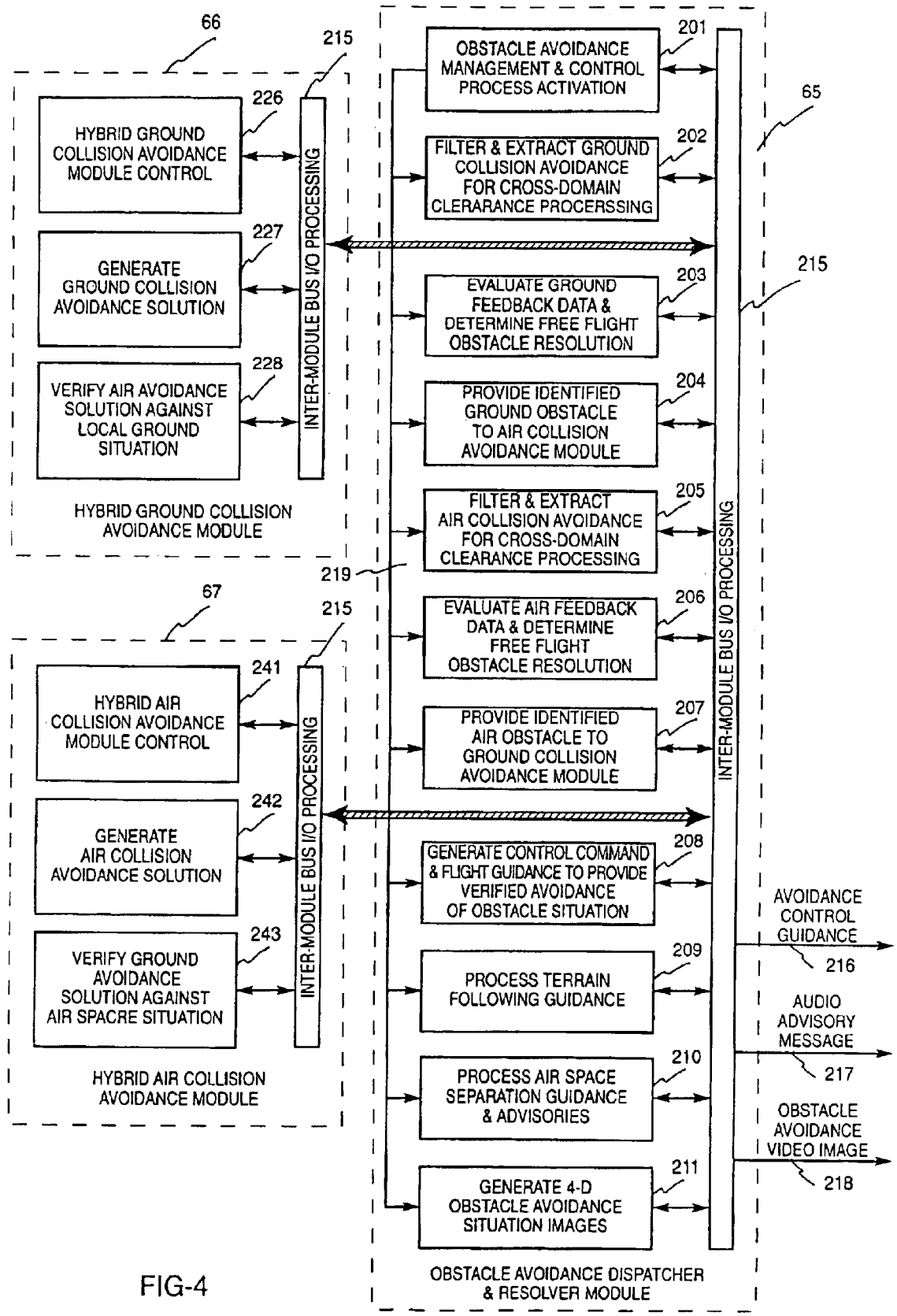
FIG. 4 is a block diagram outlining the building blocks for the Obstacle Avoidance Dispatcher and Resolver module, the Hybrid Ground Collision Avoidance module and the Hybrid Air Collision module along with the bus structure for internal and inter modules in accordance with the present invention.

Referring to FIG. 4, there is shown a more detailed block diagram of the OADRM 65 of FIG. 3. OADRM 65 has a bi-directional communication means with the two hybrid modules 66 and 67 through an inter-module bus 215. Each module of the free flight obstacle avoidance system contains various components, each of which provides a specific functional capability. The OADRM 65 contains a number of unique components to perform its functionality. The first component is an obstacle avoidance management and control process activation 201. This component provides controls and activation for the rest of components in this module through scheduler 219. The filter and extract ground collision avoidance for cross-domain processing component 202 determines if the predicted ground collision condition exists. If it does exist, this component extracts the computed escaping flight path from ground collision avoidance resolution track file 154, of FIG. 3, which at least include maneuver points, predicted maneuver initiation time, and the type of maneuvers (i.e.; pitch command, roll command, thrust command). The evaluate ground feedback and determine free flight obstacle resolution component 203 processes the data provided in ground collision avoidance resolution track file 154 to determine the status of ground verification. If the indication from HGCAM 66 is free from a ground collision condition for the ID tagged resolution, this component will send a resolution of compatibility to the HACAM 67. If the filter and extract ground collision avoidance for cross-domain processing component 202 determines that the ground collision condition does exist, it will provide the condition to the identification ground obstacle to air collision avoidance module component 204, which generates a unique identification to tag the ground resolution data prior to sending data to the HACAM 67, to positively ensure the verification data for a specific resolution. The filter extract air collision avoidance for cross-domain processing component 205 determines if the predicted air collision condition exists. If it does exist, this component extracts the computed avoidance flight path from air collision avoidance resolution track file 161, which at least includes maneuver points, avoidance maneuver initiation time, and the type of maneuvers (i.e.; target altitude, target vertical speed, thrust command). The evaluate ground feedback and determine free flight obstacle resolution component 203 processes the data provided in ground collision avoidance resolution track file 154 to determine the status of ground verification. If the indication from HACAM 67 is free from air collision conditions for the ID tagged resolution, this component sends a resolution of compatibility to the HGCAM 66. If the filter extract air collision avoidance for cross-domain processing component 205 determines that the air collision condition does exist, it will provide identification air obstacle to ground collision avoidance module component 207 and will generate a unique identification to tag the air resolution data prior to sending this information to HACAM 67. The evaluate air feedback and determine free flight obstacle resolution component 206 processes the data provided in air collision avoidance resolution track file 161 to determine the status of ground verification. If the indication from HGCAM 66 is free from ground collision conditions for the ID tagged resolution, this component sends a resolution of compatibility to HACAM 67. When the evaluate ground feedback and determine free flight obstacle resolution component 203 determines that the solution from HACAM 67 is cleared with HGCAM 66, the air solution of air avoidance is provided with a flag to indicate the obstacle avoidance solution. Similarly, when the evaluate air feedback and determine free flight obstacle resolution component 206 determines that the solution from HGCAM 66 is cleared with HACAM 67, the air solution of air avoidance is provided with a flag to indicate the obstacle avoidance solution. The obstacle avoidance solution is processed by the generate control command flight guidance component 208 to determine the avoidance flight mode and guidance control commands to couple the flight control system and thrust management system 70, of FIG. 2, with the output data avoidance control guidance 216. If the obstacle avoidance is not set and the terrain following mode is set, the predicted flight path produced by the HGCAM 66 is sent to the process terrain following guidance component 209. These components calculate vertical and lateral deviations from the target flight path and feed this data through terrain following control laws to generate specific guidance commands for the flight computer 70. If either the obstacle mode or the terrain following mode is active, the process air space separation guidance and advisories component 210 calculates the aircraft flight path deviation from the designated pathway as well as the separation between aircraft to provide advisory messages to the flight crew. The generate 4-D obstacle avoidance situation images component 211 fuses the image data from the HGCAM 66 and the image data from the HACAM 67 to provide a perspective view of air and ground collision, and overlays with the obstacle flight guidance control commands. The image displayed will provide the flight crew a comprehensive and dynamic presentation of localized airspace and the ground situation relative to the aircraft. HGCAM 66 has three functional components, the hybrid ground collision avoidance system module control component 226, the generate ground collision avoidance solution component 227 and the verify air avoidance solution against local ground situation component 228. HACAM 67 has three functional components. The hybrid air collision avoidance module control component 241 controls all the activities for the module 66. The generate air collision avoidance solution component 242 determine the air collision condition and solution for the given situation. The verify ground avoidance solution against air space situation component 243 provides a verification of air space clearance for an identified ground avoidance solution.

Figure 5:
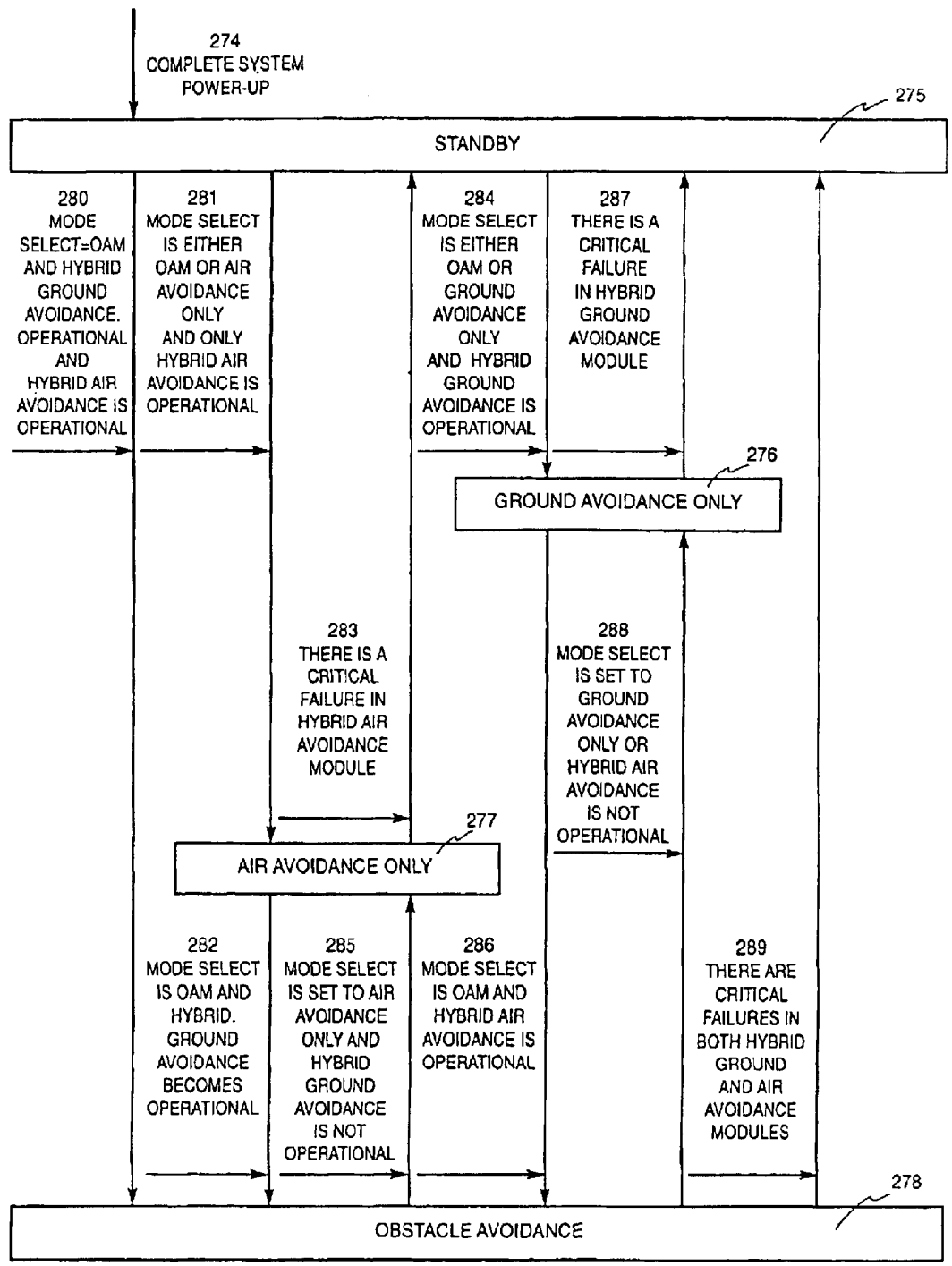
FIG. 5 is a mode transition diagram of the modes (standby, ground avoidance only, air avoidance only, and obstacle avoidance) of operation of the Embedded Free Flight Obstacle Avoidance System in accordance with the present invention.

Referring to FIG. 5, there is shown a state transition diagram providing necessary logic to allow a transition from one system mode to another system mode. The four system modes of the free flight OAS 60 are: standby mode 275, ground avoidance only mode 276, air avoidance only mode 277 and obstacle avoidance mode 278. At system power-up, after completing the power-up initiated test 274, the embedded obstacle avoidance system places the system in the standby mode 275. From the standby mode 275, if the logical conditions mode select is OAM and the hybrid ground avoidance is operational and hybrid air avoidance is operational 280, are met, the system will make a transition to the obstacle avoidance mode 278. If the logical conditions, the mode select is either OAM or air avoidance only, and the hybrid air avoidance is operational 281, are met, the system will make a transition from the standby mode 275 to the air avoidance only mode 277. If the logical conditions, the mode select is either OAM or ground avoidance only and the ground avoidance is operational 284, are met, the system will make a transition from the standby mode 275 to the ground avoidance only mode 276. From the air avoidance only mode 277, if the logical conditions, the mode select is OAM and hybrid ground avoidance becomes operational 282, are met, the system will make a transition to the obstacle avoidance mode 278. From the air avoidance only mode 277, the system will make a transition back to the standby mode 275 if the logical condition, at least a critical failure in the hybrid air avoidance module is detected 283, is met. From the ground avoidance only mode 276, the system will make a transition to the obstacle avoidance mode 278 if the logical conditions, the mode select is OAM and hybrid air avoidance is operational 286, are met. From the ground avoidance only mode 276, the system will make a transition back to the standby mode 275, if the logical condition, at least a critical failure in the hybrid ground avoidance module is detected 287, is met. From the obstacle avoidance mode 278, the system will make a transition back the standby mode 275, if the logical conditions, at least one critical failure in the hybrid ground avoidance module and one critical failure in air avoidance module are detected 289, are met. From the obstacle avoidance mode 278, the system will make a transition back to the ground avoidance mode, if the logical conditions, mode select is set to ground avoidance only or hybrid air avoidance is not operational 288, are met. From the obstacle avoidance mode 278, the system will make transition back to the air only mode 277, if the logical conditions, mode select is set to air avoidance or hybrid ground avoidance is not operational 285, are met.

Figure 6A:
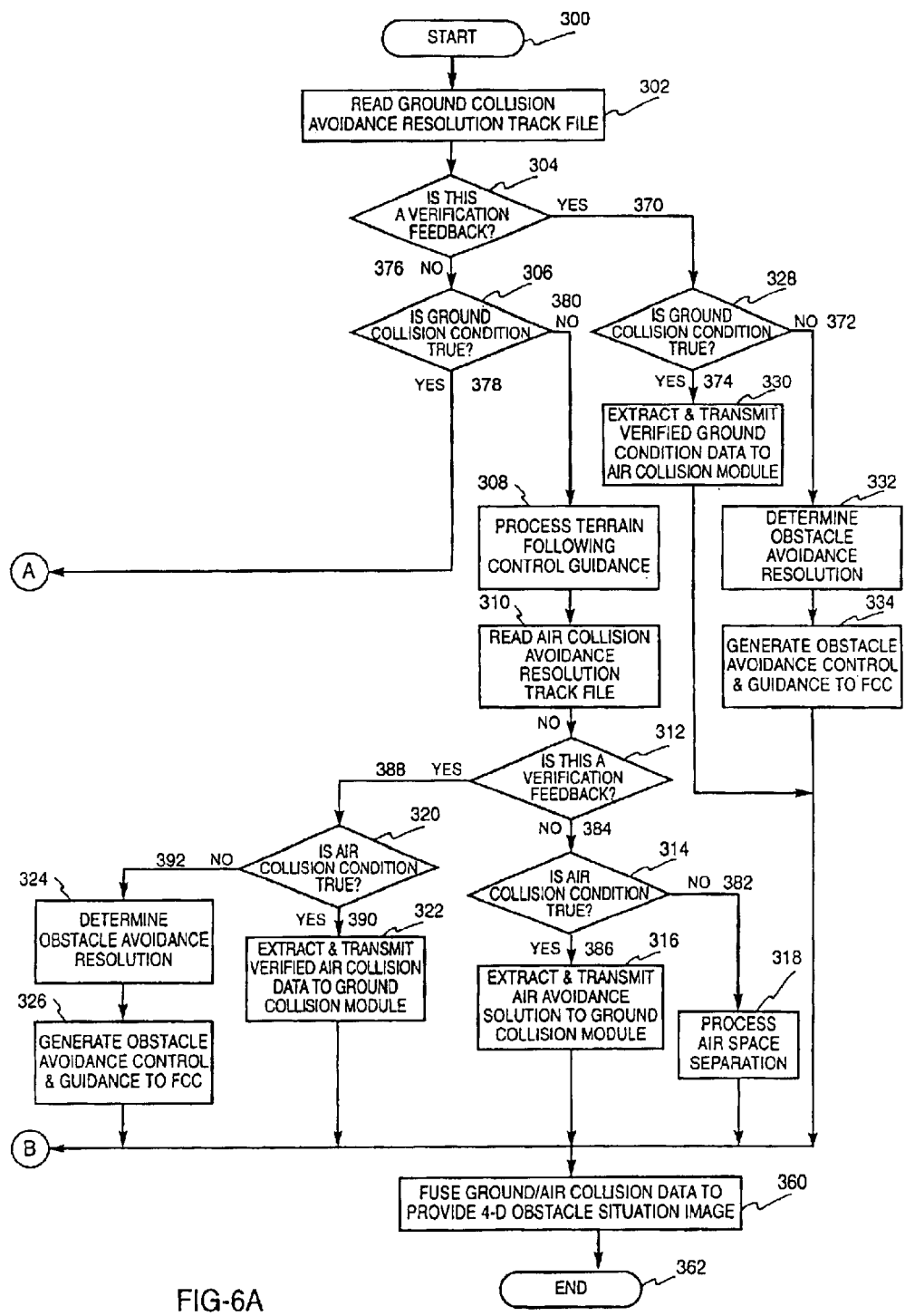
FIGS. 6a and 6b are flow diagrams outlining system behaviors with the process branching and functional activation followed by the Embedded Free Flight Obstacle Avoidance System to generate the appropriate obstacle avoidance commands, terrain following, and an obstacle situation display image, in accordance with the present invention.
Figure 6B:
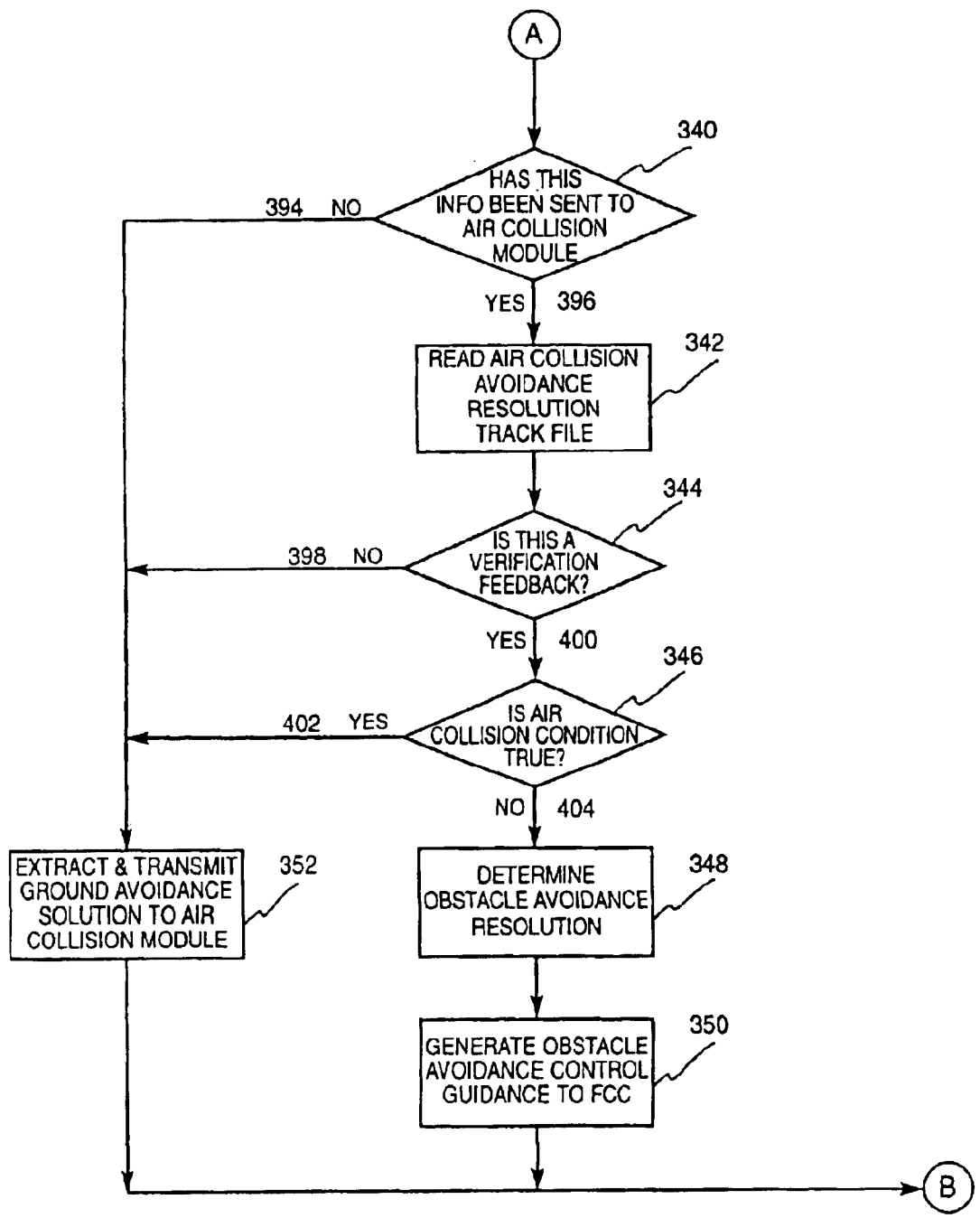

Referring to FIGS. 6a and 6b, there is shown a logic flow diagram for determining the dispatch of collision avoidance data, a resolution of avoidance solution conflict, and computation of control and guidance commands for a predicted obstacle situation. The initial step is start 300. The system reads the ground collision avoidance resolution track file 302. A test is then performed to determine if the track data is the result of a verification process through a verification feedback loop 304. If the answer is affirmative 370, a test is made to determine if the ground collision condition exists 328. If the ground collision condition does not exist 372 in the verification feedback data, the system will transform the air collision resolution into obstacle avoidance resolution 332. Thereafter, the system will input the avoidance maneuver commands to the control laws to generate guidance control commands to send to the flight control system 334. If an affirmative determination 374 is made that a ground collision condition 328 exists with in the verification feedback data 304, then the system will extract and transmit the ground related feedback data to the air collision module 330. If the ground collision condition data provided is not 376 a verification of feedback data 304, then another test will be made to determine if the ground collision condition 306 flag is set. If the flag is set 378, logical path A in FIG. 6b will be evaluated. If the ground condition 306 flag is not set 380, the system will process terrain following control guidance 308. The system will read the data contained in air collision avoidance track file 310. A test is then made to determine if the data provided by the air collision avoidance is verification feedback 312 data. If the data provided is not 384 verification feedback data 312, another test is performed to determine if the condition for air collision is true 314. If it is not true 382, the system will monitor and determine the air space separation between aircraft as well as the accuracy index referenced to the planned flight path 318. If an air collision condition exists 386, the system will extract the data from air avoidance resolution and send it to the ground collision module for verification 316. If an affirmative determination 388 is made in the verification feedback data 312, another test is performed to determine if air collision condition is true 320. If an affirmative determination 390 is made that an air collision condition 320 exists in the verification feedback data 312, the system will extract and transmit verified air collision data to ground collision module 322. If the air collision condition does not exist 392 in the verification feedback data 312, the system will transform the air collision resolution into an obstacle avoidance resolution 324. Thereafter, the system will input the avoidance maneuver commands to the control laws to generate guidance control commands to send to the flight control system 326. As shown in FIG. 6b, from path A, the system performs a test to determine if the data of the ground collision avoidance track file has been sent to the air collision module 340. If the data has not been sent to the Air Collision Module for verifying 394, the system will then extract and transmit a ground avoidance solution to air collision module 352. In step 340, if the system determines that the ground collision data was already sent 396, the system processes the air collision avoidance resolution track file 342. The system performs a test to determine if air collision data is a verification feedback data 344. If it is not a verification data 398, the system will then extract and transmit a ground avoidance solution to air collision module 352. If the data is a verification feedback data 400, then an additional test to determine if an air collision condition exists 346. If the air collision condition exists in the verification feedback data 402, the system will then extract and transmit a ground avoidance solution to air collision module 352. If air collision condition does not exist 404 in the verification feedback data, the system will transform the ground collision resolution into obstacle avoidance resolution 348. Thereafter, the system will input the avoidance maneuver commands to the control laws to generate guidance control commands to send to the flight control system 350. From path B, as shown in FIG. 6a, the system will perform the function of fusing ground and air collision data to provided a four dimensional obstacle situation image 360 and then go to the end of process flow 362 to wait for next processing cycle, repeating step 300.

Figure 7:
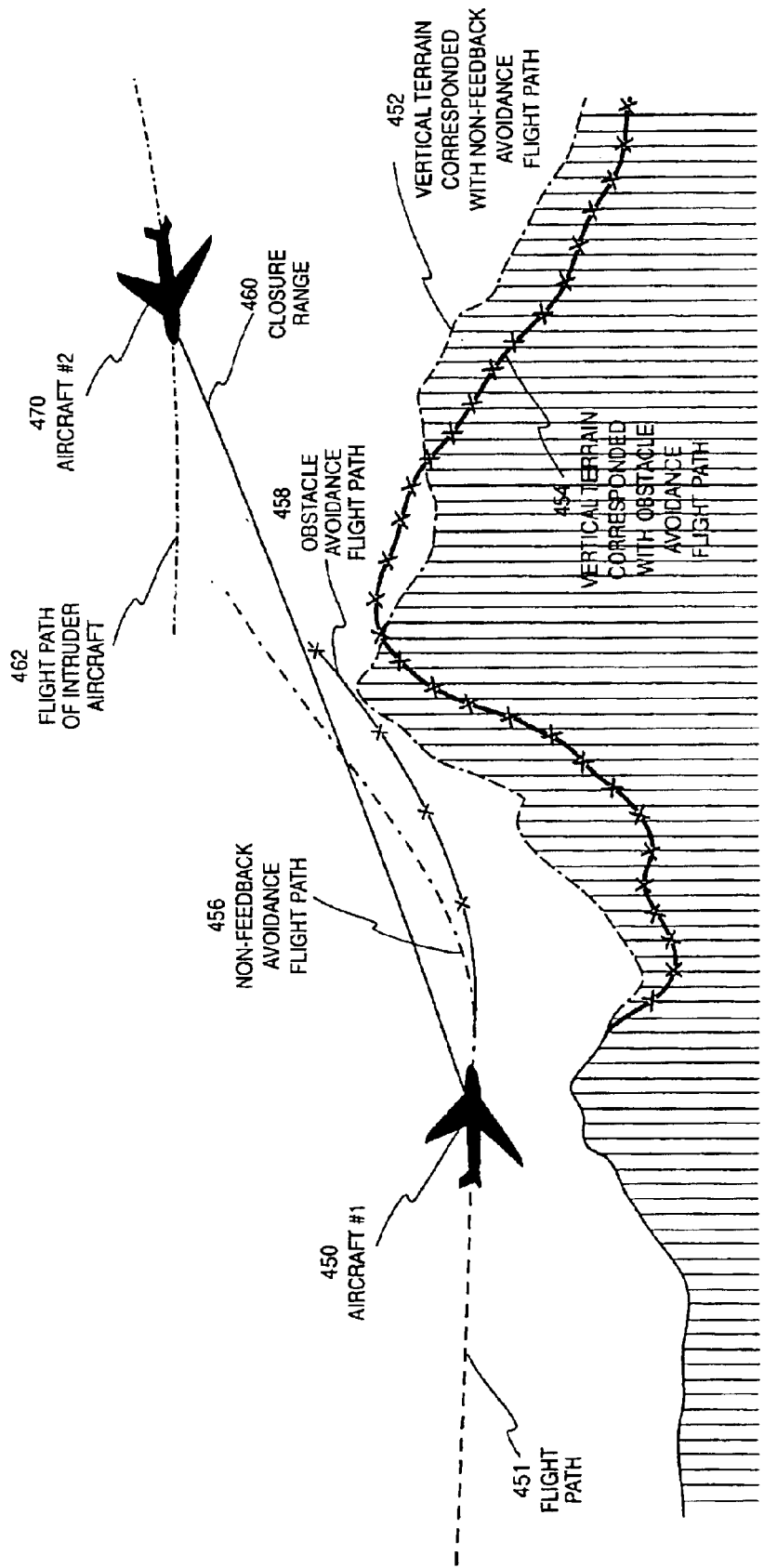
FIG. 7 is a graphical view of a vertical scanning profile of a ground collision induced air collision situation with non-feedback avoidance and hybridized feedback avoidance for a hosted aircraft in accordance with the present invention.

Referring to FIG. 7, there is shown a vertical profile of a flight situation where it is necessary to follow the computed obstacle avoidance flight path to avoid a ground collision situation for the host aircraft including a local terrain and air collision situation for the host aircraft and other aircraft operating in the same air space. Host aircraft 450 follows the flight path 451. If aircraft 450 takes the convention avoidance flight path 456, this will lead to an air collision with another aircraft 470 on its flight path 462. The vertical scan view of ground air situation 452 corresponds with the conventional avoidance flight path. However, with the obstacle solution, aircraft 450 will have obstacle avoidance flight path 458 to guide the aircraft out of a terrain collision situation and away from air collision situation 460. The vertical scan view of ground situation 454 corresponds with the obstacle avoidance flight path.

Figure 8:
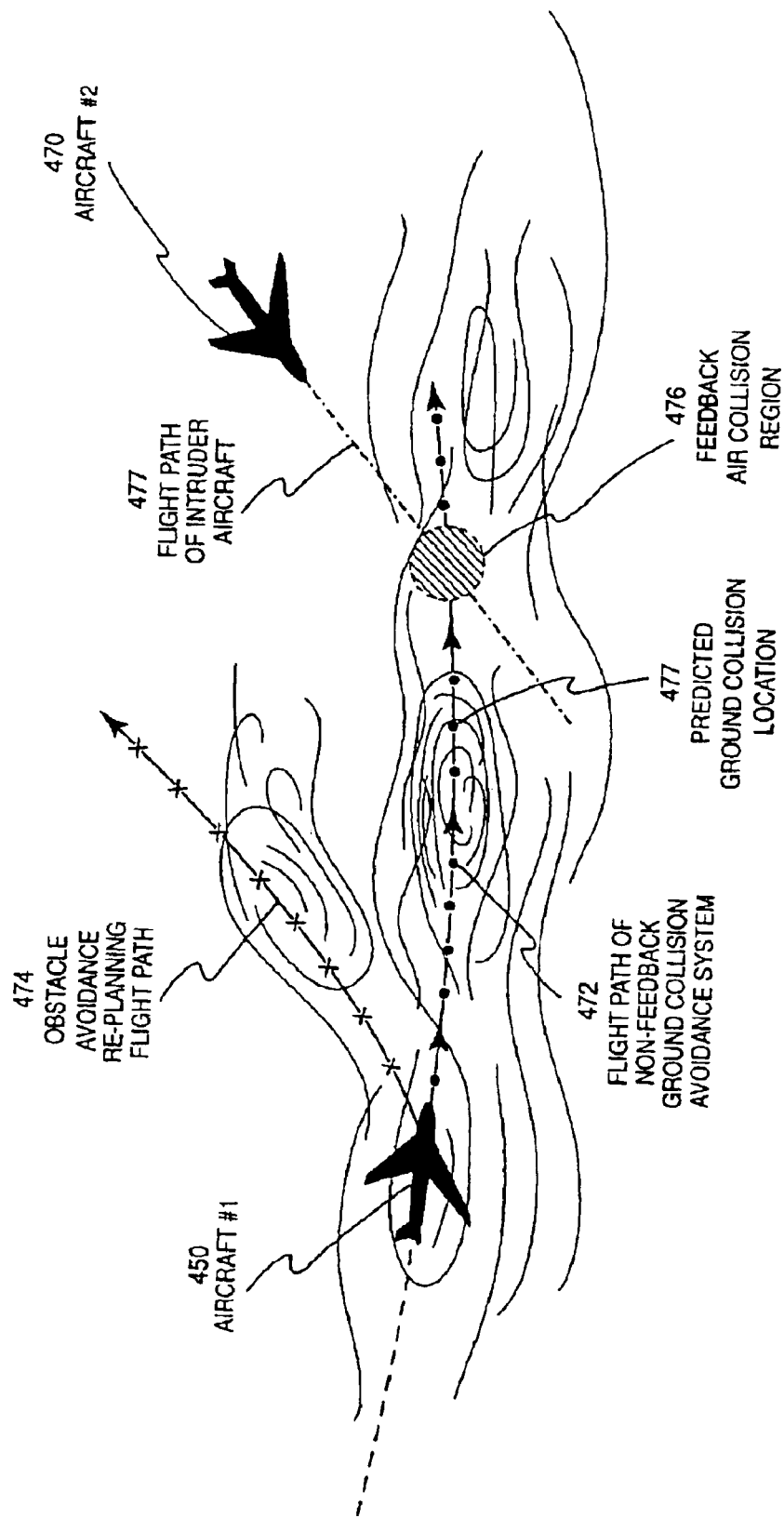
FIG. 8 is a graphical view showing a lateral scanning profile of a ground collision induced air collision situation with non-feedback avoidance and hybridized feedback avoidance for a hosted aircraft in accordance with the present invention.

Referring to FIG. 8, there is shown a lateral profile of the flight scenario as described in FIG. 7. If aircraft 450 follows flight path 472 generated by the non-feedback ground collision avoidance system to avoid the predicted ground collision location 477, this leads to a situation of ground collision induced air collision 476. This situation can be avoided with the feedback of the air collision module performed by the hybrid air collision avoidance module 67 with the obstacle avoidance flight path 474. The computed obstacle re-planning path 474 will guide aircraft 450 not only out of the predicted ground collision 477 but also away from the potential collision 476 with intruder aircraft 470.

Figure 9:
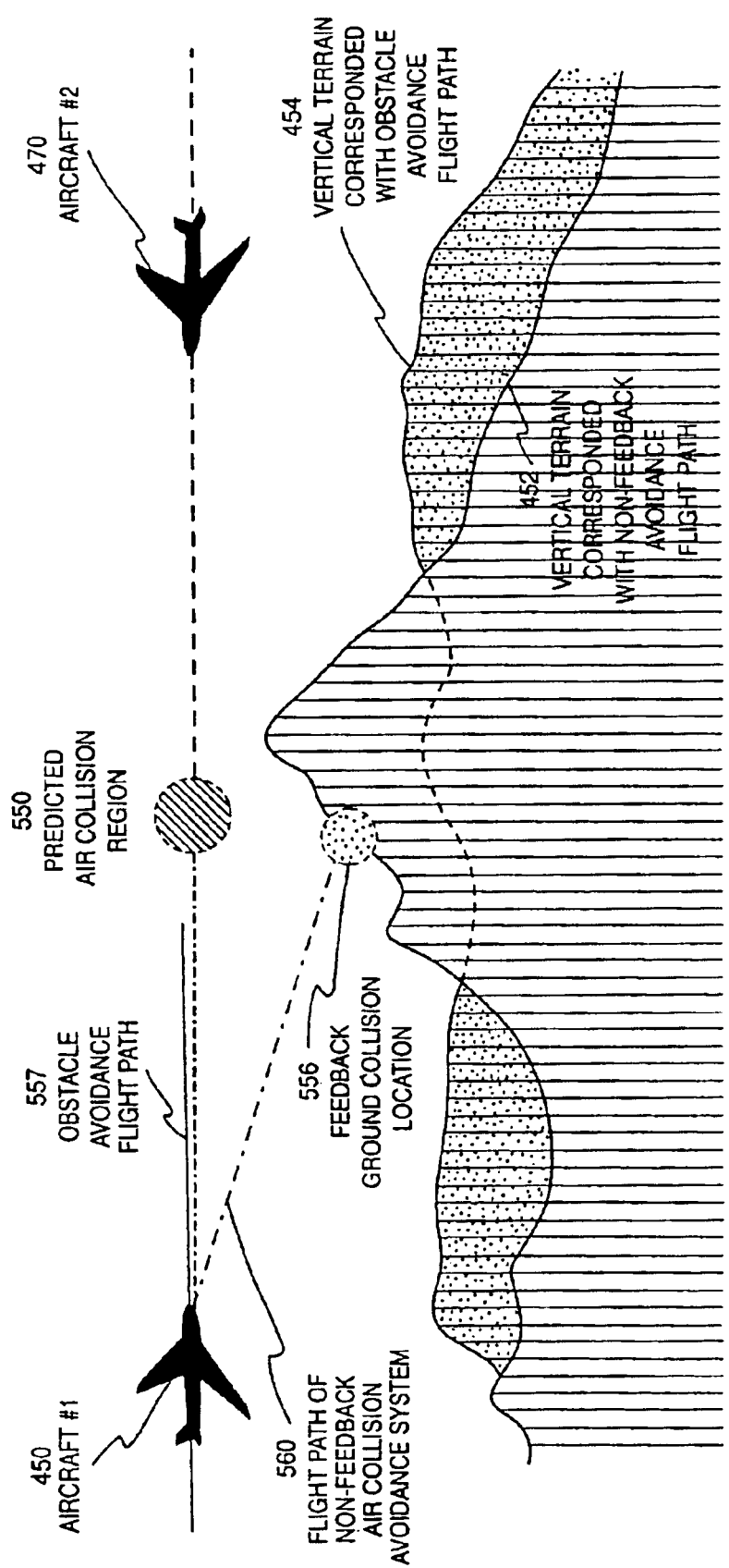
FIG. 9 is a graphical view of a vertical scanning profile of an air induced ground collision situation with non-feedback avoidance and hybridized feedback avoidance for a hosted aircraft in accordance with the present invention.

Referring to FIG. 9, there is shown a vertical profile of a flight situation where predicted air collision avoidance guidance induces a ground collision situation. If aircraft 450 takes flight path 560 produced by a non-feedback air collision avoidance system, then potentially the ground collision situation 556 will be detected possibly too late. This situation can be predicted by hybrid ground collision avoidance module 66, which sends this data back to the obstacle avoidance dispatcher and resolver module 65. Vertical scan view of ground air situation 552 corresponds with the "conventional" non-feedback avoidance flight path. However, with the obstacle solution, aircraft 450 will have obstacle avoidance flight path 557 to guide the aircraft out of a terrain collision situation and away from an air collision situation 550. The vertical scan view of ground situation 554 corresponds with the obstacle avoidance flight path.

Figure 10:
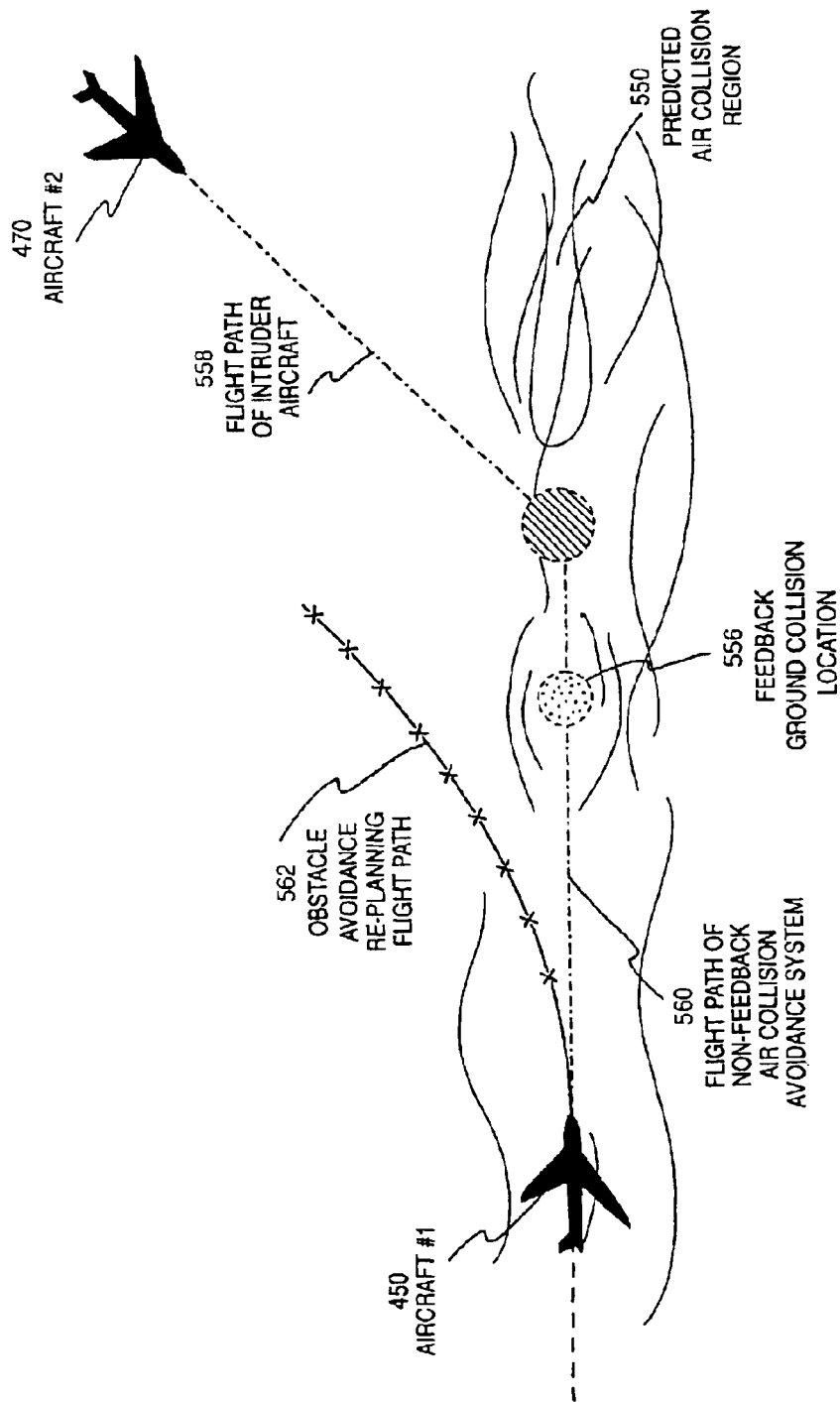
FIG. 10 is graphical view of a lateral scanning profile of an air induced ground collision situation with non-feedback avoidance and hybridized feedback avoidance for a hosted aircraft in accordance with the present invention.

Referring to FIG. 10, there is shown a lateral profile of the flight situation as described in FIG. 9. If aircraft 450 follows flight path 560 generated by an air collision avoidance system with no-ground situation feedback to avoid a predicted air collision situation 550, this leads to a situation of induced ground collision 556. This induced ground collision situation can be completely avoided with the feedback of the hybrid ground collision module. This allows a re-generation of obstacle avoidance re-planning flight path 562. This flight path will take the hosted aircraft to a course that will be away from the collision course with the flight path 558 of the intruder aircraft 470.

Figure 11:
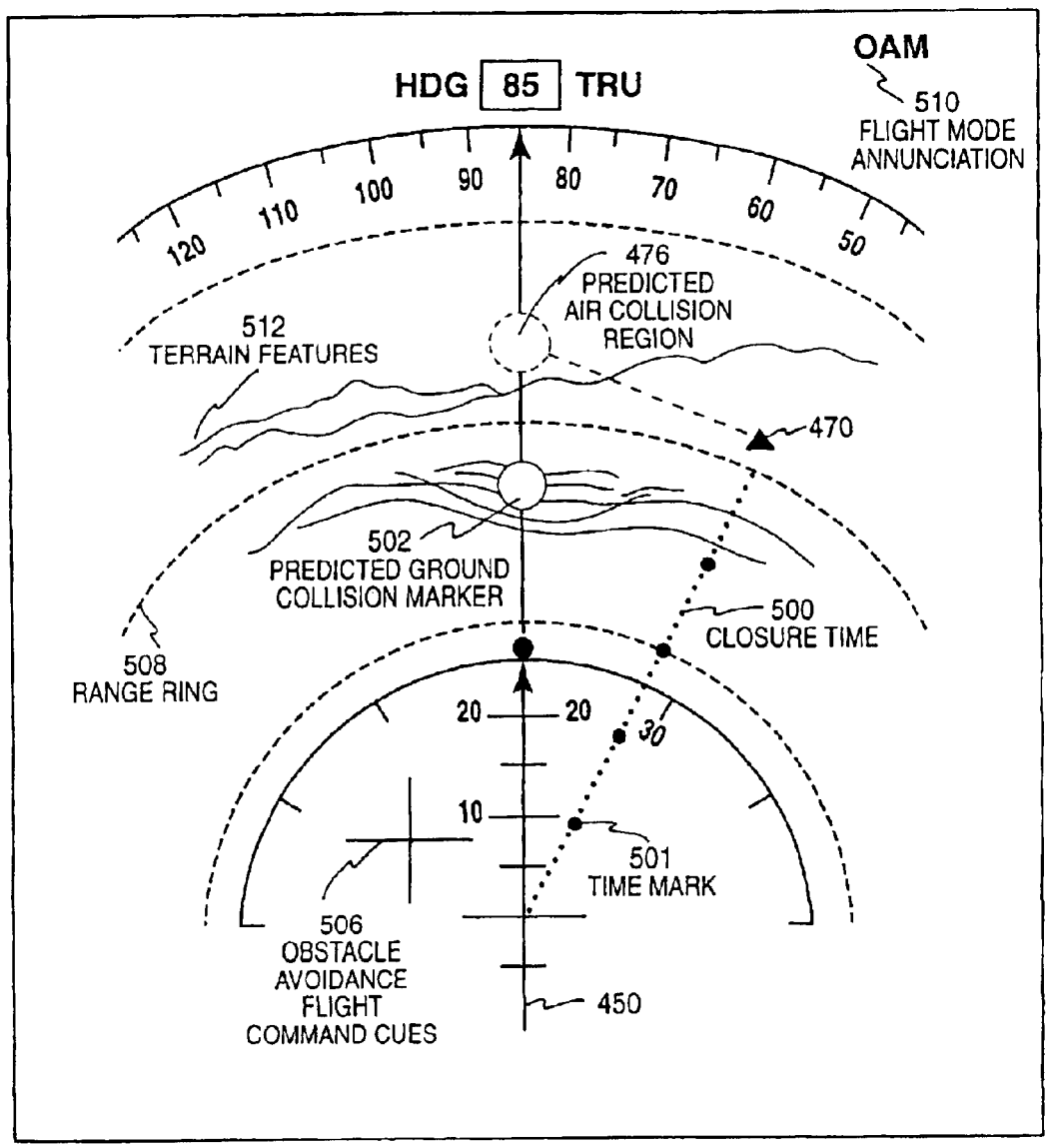
FIG. 11 is an image of the 4-D presentation wherein the ground obstacle is linked with the projection of an induced air collision expressed in terms of ground distance and closure time in accordance with the present invention.

Referring to FIG. 11, there is shown a display format of an obstacle avoidance situation. The format presents a combined situation of ground collision and air collision. In this display image, the Obstacle Avoidance Mode (OAM) 510 is active impending a prediction of ground collision as annotated with predicted ground collision marker 502 overlaying terrain features 512 and in conjunction, an inducted air collision condition has been predicted as shown with a slow flashing dashed circle 476. Included is a range ring 508 with dashed green circles to show the ground range around the hosted aircraft 450 in nautical miles. If incoming aircraft 470 is in a flight path on a collision path with the hosted aircraft 450, the symboloy will change from green to amber and can have a closure distance time line 500, as shown. On this time line 550, time marks 501 can be used to indicate time units of multiple seconds. To guide the aircraft out a of collision condition, the obstacle avoidance commands are not only provided to the flight control system, but also be processed and displayed as flight guidance command cues 506 to the flight crew.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A method for free flight obstacle avoidance, the method comprising the steps of:

providing a ground collision avoidance module and an air collision avoidance module;

providing an obstacle avoidance dispatcher and resolver module;

routing ground collision solution data from the ground collision avoidance module to the obstacle avoidance dispatcher and resolver module;

routing air collision solution data from the air collision avoidance module to the obstacle avoidance dispatcher and resolver module;

filtering the ground collision solution data and the air collision solution data;

commanding the ground collision avoidance module to validate the ground collision solution data and commanding the air collision avoidance module to validate the air collision solution data;

providing feedback from the obstacle avoidance dispatcher and resolver module with the ground collision solution data and the air collision solution data to the ground collision avoidance module and the air collision avoidance module for evaluation; and generating a final obstacle avoidance solution from the obstacle avoidance dispatcher and resolver module.

2. The method of claim 1 wherein the step of filtering the ground collision solution data comprises filtering and extracting the ground collision solution data for processing a cross-domain clearance.

3. The method of claim 1 further comprising the step of evaluating the ground collision solution data from a feedback loop and determining a first obstacle avoidance solution.

4. The method of claim 1 wherein step of providing feedback from the obstacle avoidance dispatcher and resolver module with the ground collision solution data and the air collision solution data to the ground collision avoidance module and the air collision avoidance module for evaluation comprises providing identified ground obstacle data to the air collision avoidance module.

5. The method of claim 1 wherein the step of filtering the air collision solution data comprises filtering and extracting the air collision solution data for processing a cross-domain clearance.

6. The method of claim 1 further comprising the step of evaluating the air collision solution data from a feedback loop and determining a second obstacle avoidance solution.

7. The method of claim 1 wherein step of providing feedback from the obstacle avoidance dispatcher and resolver module with the ground collision solution data and the air collision solution data to the ground collision avoidance module and the air collision avoidance module for evaluation comprises providing identified air obstacle data to the ground collision avoidance module.

8. The method of claim 1 further comprising the step of generating a control command and a flight guidance for executing the final obstacle avoidance solution.

9. The method of claim 1 further comprising the step of processing terrain following guidance data.

10. The method of claim 1 further comprising the step of processing air space separation guidance data and issuing flight crew advisories.

11. A free flight obstacle avoidance system for an aircraft comprising a ground collision avoidance module and an air collision avoidance module, the apparatus comprising:

an obstacle avoidance dispatcher and resolver module;

a means for routing ground collision solution data from the ground collision avoidance module to the obstacle avoidance dispatcher and resolver module;

a means for routing air collision solution data from the air collision avoidance module to the obstacle avoidance dispatcher and resolver module;

a filter for filtering the ground collision solution data and the air collision solution data;

a means for commanding the ground collision avoidance module to validate the ground collision solution data and a means for commanding the air collision avoidance module to validate the air collision solution data;

a feedback loop from the obstacle avoidance dispatcher and resolver module to the ground collision avoidance module and the air collision avoidance module for sharing the ground collision solution data and the air collision solution data; and a means for generating a final obstacle avoidance solution from the obstacle avoidance dispatcher and resolver module.

12. The obstacle avoidance system in accordance with claim 11 wherein said obstacle avoidance dispatcher and resolver module comprises a filter and extract ground collision avoidance component for processing a cross-domain clearance.

13. The obstacle avoidance system in accordance with claim 11 wherein said obstacle avoidance dispatcher and resolver module comprises a component for evaluating the ground collision solution data from the feedback loop and for determining a first flight obstacle avoidance solution.

14. The obstacle avoidance system in accordance with claim 11 wherein said obstacle avoidance dispatcher and resolver module comprises a component for providing identified ground obstacle data to the air collision avoidance module.

15. The obstacle avoidance system in accordance with claim 11 wherein said obstacle avoidance dispatcher and resolver module comprises a filter and extract air collision avoidance component for processing a cross-domain clearance.

16. The obstacle avoidance system in accordance with claim 11 wherein said obstacle avoidance dispatcher and resolver module comprises a component for evaluating air collision solution data from the feedback loop and for determining a second obstacle avoidance resolution.

17. The obstacle avoidance system in accordance with claim 11 wherein said obstacle avoidance dispatcher and resolver module comprises a component for providing identified air obstacles to the ground collision avoidance module.

18. The obstacle avoidance system in accordance with claim 11 wherein said obstacle avoidance dispatcher and resolver module comprises a generate control command and flight guidance component for executing the final obstacle avoidance solution.

19. The obstacle avoidance system in accordance with claim 11 wherein said obstacle avoidance dispatcher and resolver module comprises a terrain following guidance component.

20. The obstacle avoidance system in accordance with claim 11 wherein said obstacle avoidance dispatcher and resolver module comprises an air space separation guidance and advisory component.

21. The obstacle avoidance system in accordance with claim 20 wherein said air space separation guidance and advisory component comprises a control and warnings apparatus for maintaining the aircraft within a specified corridor.

* * * * *